(12) United States Patent
Beck

(10) Patent No.: US 8,887,882 B2
(45) Date of Patent: Nov. 18, 2014

(54) VIBRATION DAMPER WITH INTEGRATED LEVEL CONTROL

(75) Inventor: Hubert Beck, Eitorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 203 days.

(21) Appl. No.: 13/075,219

(22) Filed: Mar. 30, 2011

(65) Prior Publication Data
US 2011/0240424 A1 Oct. 6, 2011

(30) Foreign Application Priority Data
Mar. 30, 2010 (DE) .......................... 10 2010 013 394

(51) Int. Cl.
  F16F 9/36 (2006.01)
  F16F 9/06 (2006.01)
  B60G 17/08 (2006.01)
(52) U.S. Cl.
  CPC .............. B60G 17/08 (2013.01); F16F 9/063 (2013.01); B60G 2500/30 (2013.01); B60G 2202/24 (2013.01); Y10S 267/02 (2013.01)
  USPC .............. 188/322.17; 267/64.17; 267/DIG. 2
(58) Field of Classification Search
  USPC ................. 188/276, 284, 289, 297, 298, 312, 188/322.16, 322.17, 322.19; 267/64.16, 267/64.17, DIG. 2, 217, 221
  See application file for complete search history.

(56) References Cited

U.S. PATENT DOCUMENTS

| | | | |
|---|---|---|---|
| 3,480,269 A | 2/1968 | Jewell et al. | |
| 4,360,192 A * | 11/1982 | Ishida | 267/64.28 |
| 4,502,672 A | 3/1985 | Meller et al. | |
| 5,169,131 A * | 12/1992 | Shimura | 267/221 |
| 5,941,508 A * | 8/1999 | Murata et al. | 267/64.17 |
| 6,494,441 B2 * | 12/2002 | Beck et al. | 267/64.16 |
| 364,142 A1 | 4/2008 | Beck | |
| 7,921,974 B2 * | 4/2011 | Becker | 188/322.19 |
| 2003/0213664 A1 * | 11/2003 | Beck | 188/289 |
| 2004/0124051 A1 * | 7/2004 | Lun et al. | 188/267.1 |
| 2005/0199457 A1 | 9/2005 | Beck | |
| 2009/0283373 A1 * | 11/2009 | Satou et al. | 188/319.1 |

FOREIGN PATENT DOCUMENTS

| | | |
|---|---|---|
| DE | 1 936 858 | 2/1971 |
| DE | 30 04 307 | 8/1981 |
| DE | 199 38 084 | 7/2000 |
| DE | 10 2004 011 632 | 8/2005 |
| JP | 08 247 199 | 9/1996 |

\* cited by examiner

*Primary Examiner* — Bradley King
*Assistant Examiner* — Nicholas J Lane
(74) *Attorney, Agent, or Firm* — Cozen O'Connor

(57) ABSTRACT

A vibration damper with integrated level control includes a cylinder in which a hollow piston rod with a piston outfitted with damping valves is guided so as to be axially movable. The piston divides the cylinder into a workspace on the piston rod side and a workspace remote of the piston rod. The workspace on the piston rod side is limited at the end by a piston rod guide, and the workspace remote of the piston rod is connected to a pump space by at least one connection opening in a separating wall. The separating wall supports a hollow rod on which the piston slides and controls the pump operation of the vibration damper. A compensation space receives the damping volume displaced by the piston rod due to a dynamic load, and the piston rod guide is guided in the cylinder so as to be movable axially, and the connection opening in the separating wall is outfitted with a valve that opens in the direction of the work space remote of the piston rod.

10 Claims, 3 Drawing Sheets

VIBRATION DAMPER WITH INTEGRATED LEVEL CONTROL

BACKGROUND OF THE INVENTION

1. Field of the Invention

The invention is directed to a vibration damper with integrated level control.

2. Description of the Related Art

A vibration damper with integrated level control should compensate for a sinking of the vehicle body caused by a static load. Damping medium is transferred from a pump space to a work space by the spring compression movement of the vibration damper so that a piston rod of the vibration damper carries out an extension movement. In addition to a pump space, a vibration damper of this kind has a compensation space that compensates for the damping medium volume displaced by the piston rod because of dynamic compression movements and rebound movements when the desired level position is reached.

As is shown in DE 30 04 307, at least one inner cylinder, one outer cylinder, a pump rod with a pump valve, and a suction rod for the pump space are required in order to separate the pump space, compensation space, and work space from one another. The pump rod is arranged on a separating disk between a work space remote of the piston rod and the pump space.

SUMMARY OF THE INVENTION

It is an object of the present invention to reduce the construction cost of a vibration damper with integrated level control.

According to one embodiment of the invention, the piston rod guide is guided in the cylinder so as to be movable axially, and the connection opening in the separating wall is outfitted with a valve that opens in the direction of the work space remote of the piston rod.

One advantage a very simple unit in which the suction rod can be omitted. Further, the operating pressure in the vibration damper is comparatively low because the pump space need not be preloaded under pressure.

In one embodiment, the hollow rod has an open connection opening to the work space remote of the piston rod in the area of a desired level position of the piston. The hollow rod does not require a special valve so that this structural component part can be formed by a simple semi-finished product that is cut to a desired dimension.

In one embodiment, the pump space is arranged axially in series with the work spaces. Only one individual cylinder is needed for this purpose.

An alternative variant is characterized in that the cylinder is at least partially enclosed by an outer cylinder, and the pump space is formed between two cylinders. This constructional form results in an added advantage with respect to length.

According to one embodiment, a vehicle suspension spring is supported at the axially movable piston rod guide.

Further, it can be provided that the maximum extension position of the piston rod guide is limited by a stop on the cylinder side. This simple step ensures that the vibration damper cannot fall apart in the uninstalled state.

Optionally, the separating wall can have a pressure relief valve which opens in direction of the pump space.

According to one embodiment, a stationary annular throttle disk that determines the maximum extension position of the piston can be associated with the axially movable piston rod guide in direction of the work space on the piston rod side. The throttle disk causes a pressure gradient between the work space on the piston rod side and the piston rod guide.

A throttle cross section of the throttle disk can be formed, for example, by a through-opening receiving the piston rod. The extra expenditure for this additional function is limited because the piston rod is already a precision-made structural component part.

It is also possible that a stop spring which contacts the throttle disk is arranged at the constructional unit comprising the piston rod and piston.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail referring to the following description of the drawings. In the drawings.

DETAILED DESCRIPTION OF THE PRESENTLY PREFERRED EMBODIMENTS

Figure 1:
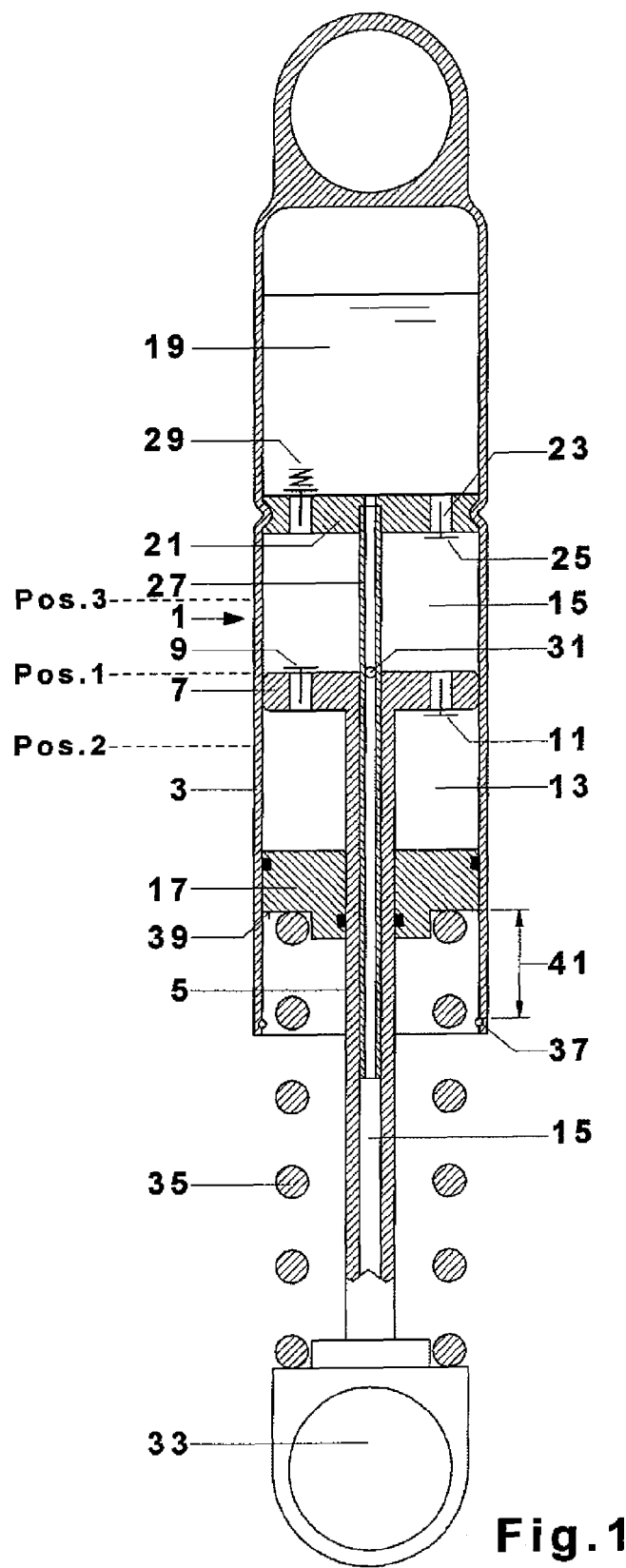
FIG. 1 is a vibration damper with integrated level control with a monotube construction.

FIG. 1 shows a vibration damper 1 with integrated level control comprising an individual cylinder 3 in which a piston rod 5 with piston 7 is guided so as to be axially displaceable. The piston 7 is outfitted with damping valves 9; 11 and divides the cylinder 3 into a work space 13 on the piston rod side which is completely filled with damping medium and a work space 15 remote of the piston rod.

The work space 13 on the piston rod side is limited at the end by a piston rod guide 17 which is axially movable in the cylinder 3. Following the work space 15 remote of the piston rod axially in series is a pump space 19 which is also at least partially filled with damping medium, a separating wall 21 being fixed between the two spaces 15, 19. At least one connection opening 23 is constructed in the separating wall 21 and is outfitted with a valve 25 which opens in direction of the work space 15 remote of the piston rod. Further, the separating wall 21 supports a hollow rod 27 which is connected to the pump space 19, the piston 7 sliding on its outer lateral surface. Optionally, a pressure relief valve 29 opening in direction of the pump space 19 can be constructed in the separating wall.

In the area of a desired level position of the piston 7, the hollow rod 27 has an open connection opening 31 to the work space remote of the piston rod. A vehicle suspension spring 35 is tensioned between the piston rod guide 17 and a connection member 33 on the piston rod side. In addition, a retaining ring, known per se, serves as stop 37 for determining the maximum extension position of the piston rod guide 17 in the cylinder 3.

In FIG. 1, the piston occupies position 1, i.e., the desired level position of the piston 7 and, therefore, of the piston rod 5 is reached. When the piston rod 5 moves inward in the cylinder 3, the connection opening 31 in the hollow rod 27 is closed. The valve 25 and the optional pressure relief valve 29 in the separating wall 21 are closed. Consequently, the displaced damping medium in its entirety is displaced through the damping valve 11 in the piston 7 into the work space 13 on the piston rod side. The cross-sectional area of the work space 13 on the piston rod side is smaller than the cross-sectional area of the work space 15 remote of the piston rod by an amount corresponding to the cross-sectional area of the hollow piston rod 5. The volume displaced by the piston rod causes an axial displacement of the piston rod guide 17 against the spring force of the vehicle suspension spring 35.

When the spring force of the vehicle suspension spring 35 is small, the piston rod guide 17 can be moved by a small displacing force. In this case, it is useful when the stop 37 determines the extension position of the piston rod guide 17. When a large spring force is selected for the vehicle suspension spring 35, an equilibrium of forces can be achieved between the displacing force on the piston rod 5 and the counterforce of the vehicle suspension spring 35 so that a stop 37 for the piston rod guide 17 is superfluous.

When the piston rod 5 carries out an extension movement, the work space 13 on the piston rod side is compressed and damping medium can flow out through the damping valve 9 in the piston 7 into the work space 15 remote of the piston rod. With a soft vehicle suspension spring 35, the pressing force in the work space 13 on the piston rod side is supported by the stop 37. Damping medium can then flow subsequently from the pump space 19 via the opened valve 25 in the separating wall 21. A hard vehicle suspension spring 35 leads to an inward movement of the piston rod guide 17 because the volume in the work space 15 remote of the piston rod which is lost as a result of an extension movement of the piston rod 5 is compensated. The distance between an outer end face 39 of the piston rod guide 17 and the maximum extension position of the piston rod guide in the cylinder defines a compensation space 41 for the damping medium volume displaced by the piston rod 5 in the two work spaces 13; 15. In addition, damping medium flows out of the pump space 19 through the hollow rod 27 via the connection opening 31 in the work space 15 remote of the piston rod, which connection opening 31 is opened during an extension movement.

Starting from an extension position of the piston, e.g., position 2, damping medium is displaced via the open connection opening 31 into the pump space 19 during an inward movement. As soon as the piston closes the connection opening 31 in the hollow rod, the displaced damping medium volume in its entirety is displaced via the damping valve 11 into the work space 13 on the piston rod side.

When the piston occupies, e.g., position 3 owing to a static load, the connection opening 31 in the hollow rod 27 is closed. When the piston rod 5 with the piston 7 moves outward, damping medium flows out of the pump space 19 via the open valve 25 in the separating wall 21 into the work space 15 remote of the piston rod. During a subsequent inward movement, the piston is supported on the additional damping medium volume. Every further extension movement of the piston rod during which the piston 7 is located between the connection opening 31 and the separating wall 21 leads to a displacement of a damping medium volume from the pump space 19 on which the piston rod is supported in a stationary manner. Further, the displacement of damping medium also acts on the piston 7 which causes a displacement of the piston rod guide 17 via the piston rod 5 so that the preloading of the vehicle suspension spring 35 is increased and, therefore, the piston rod 5 moves out of the cylinder 3.

Figure 2:
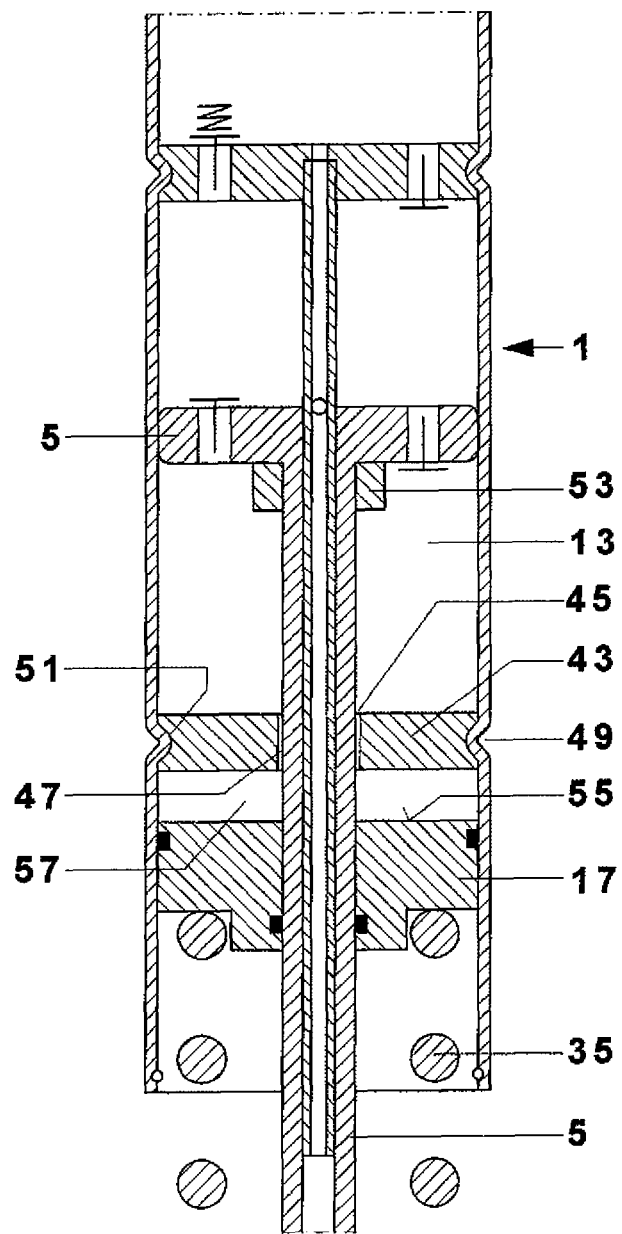
FIG. 2 is the vibration damper according to FIG. 1 with a throttle disk.

FIG. 2 is a modification of FIG. 1. The basic operating principle and the structural component parts which are used are identical to those in FIG. 1. In addition, a stationary annular throttle disk 43 which determines the maximum extension position of the piston 7 is associated with the axially movable piston rod guide 17 in direction of the work space 13 on the piston rod side. A throttle cross section 45 is preferably formed by a through-opening 47 receiving the piston rod 5. The throttle disk 43 is fixed axially, for example, by a radial beading 49 of the cylinder 3 which is at least shaped into a groove 51 in the outer lateral surface of the throttle disk 43. A stop spring 53 which contacts the throttle disk 43 after a certain stroke position of the piston rod 5 is arranged at the constructional unit comprising the piston rod 5 and piston 7.

The throttle cross section 45 provides for a pressure gradient between the work space 13 on the piston rod side and an underside 55 of the piston rod guide 17. This pressure gradient has an effect on the displacing movement of the piston rod guide 17. The preloading force of the vehicle suspension spring 35 can be influenced by the dimensioning of the throttle cross section 45 based on the displacing movement of the piston rod 5. Optionally, the annular stop spring 53 can also completely close the throttle cross section as is shown in FIG. 2. An intermediate space 57 between the underside 55 of the piston rod guide 17 and the throttle disk 43 is then separated from the work space 13 on the piston rod side. When the throttle cross section 45 is in the closed operating state, the movement of the piston rod guide 17 is blocked. Therefore, the movement of the piston rod guide 17 can be separated from the movement of the piston rod 5 over a limited portion of the stroke, namely, the stroke distance of the stop spring 53 when the throttle cross section 45 is closed.

Figure 3:
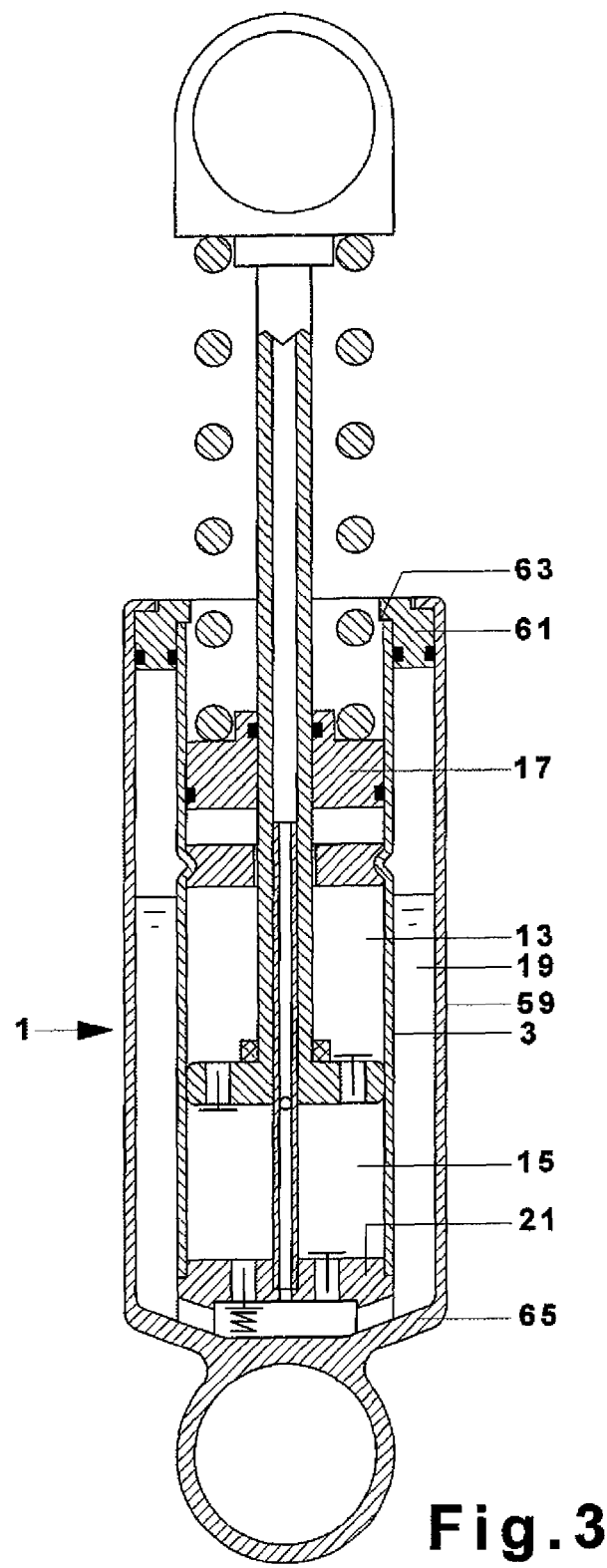
FIG. 3 is a vibration damper with integrated level control in dual tube construction.

FIG. 3 shows a vibration damper with integrated level control in dual tube construction. In contrast to FIGS. 1 and 2, in which the pump space 19 is arranged axially in series with the work spaces 13; 15, the cylinder according to FIG. 1 or 2 is at least partially enclosed by an outer cylinder 59, the pump space 19 being carried out annularly between the two cylinders 3; 59. In practice, a unit according to FIG. 1 or 2 is enclosed by the additional cylinder 59. The functional principle is the same as that shown in FIG. 2. In the area of the exit side of the piston rod, an annular cover 61 is clamped between the outer cylinder 59 and the cylinder 3. The annular cover 61 closes the pump space 19 and has a smaller inner diameter than the cylinder 3 so that the extension movement of the piston rod guide 17 is formed by a stop on the cylinder side formed by the projecting portion 63 of the annular cover 61. The other end of the pump space 19 is limited by the separating wall 21 which is supported on a base 65 of the outer cylinder 59.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A vibration damper with integrated level control, comprising:
   a hollow piston rod with a piston having at least two damping valves
   a fixed separating wall;
   a cylinder in which the hollow piston rod with the piston is guided so as to be axially movable, the piston divides the cylinder into a first work space on the piston rod side and a second work space remote of the piston rod bounded by the piston and the separating wall;
   a piston rod guide arranged in the cylinder so as to be movable axially and configured to limit the first work space on the piston rod side;
   a pump space connected to the second work space remote of the piston rod by at least one connection opening in the separating wall, the connection opening having a valve that opens directly into the second work space remote of the piston rod;
   a hollow rod supported by the separating wall on which the piston slides and that controls the pump operation of the vibration damper;
   a compensation space defined at least by an outer face of the axially movable piston rod guide that receives a damping volume displaced by the piston rod due to a dynamic load; and
   a vehicle suspension spring supported at the outer face of the axially movable piston rod guide.

2. The vibration damper according to claim 1, wherein the hollow rod has an open connection opening to the second work space remote of the piston rod in an area of a desired level position of the piston.

3. The vibration damper according to claim 1, wherein the pump space is arranged axially in series with the first and second work spaces.

4. The vibration damper according to claim 1, wherein the cylinder is at least partially enclosed by an outer cylinder, and the pump space is formed radially between the two cylinders.

5. The vibration damper according to claim 1, further comprising a stop on the cylinder side configured to limit the piston rod guide to a maximum extension position.

6. The vibration damper according to claim 1, wherein the separating wall has a pressure relief valve that opens towards the pump space.

7. The vibration damper according to claim 1, further comprising a stationary annular throttle disk that determines a maximum extension position of the piston associated with the axially movable piston rod guide in direction of the first work space on the piston rod side.

8. The vibration damper according to claim 7, wherein a throttle cross section of the throttle disk is formed by a through-opening receiving the piston rod.

9. The vibration damper according to claim 7, wherein a stop spring that contacts the throttle disk is arranged at the constructional unit comprising the piston rod and piston.

10. The vibration damper according to claim 5, further comprising a stationary annular throttle disk that determines the maximum extension position of the piston associated with the axially movable piston rod guide in direction of the first work space on the piston rod side.

* * * * *